Dec. 31, 1935.  H. E. WHITE  2,026,007
COIL SPRING
Filed Jan. 4, 1934
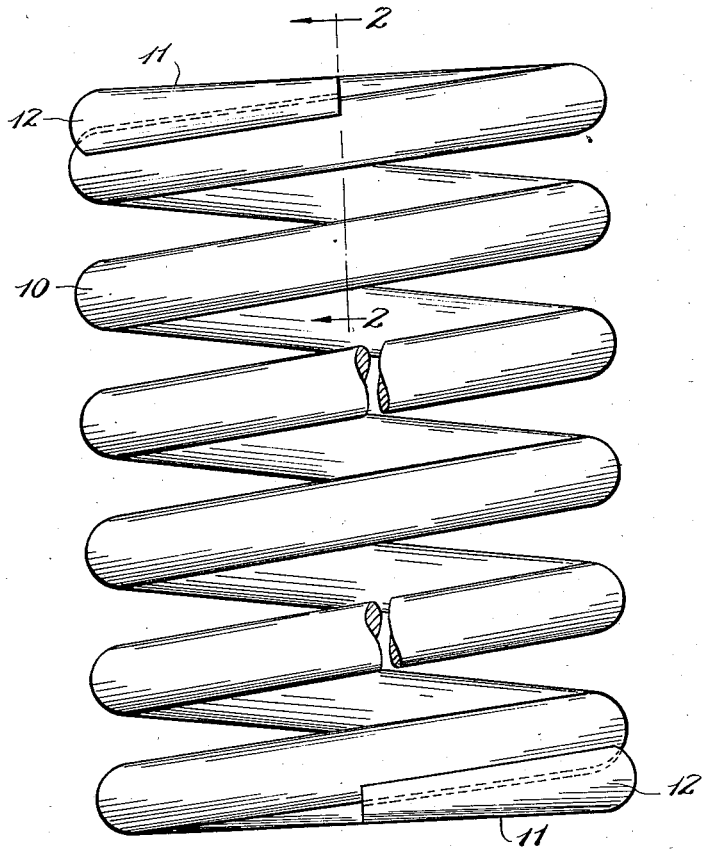
FIG. 1
FIG. 4
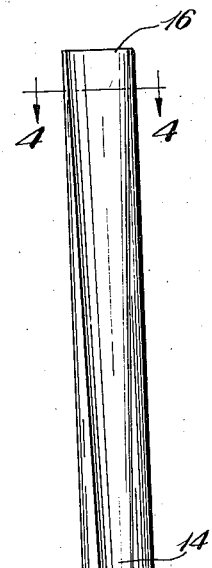
FIG. 3
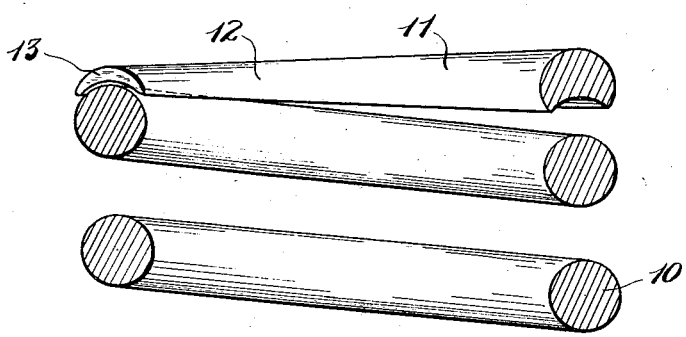
FIG. 2
INVENTOR:
HERBERT E. WHITE
Kwis Hudson & Kent
ATTORNEYS Patented Dec. 31, 1935

2,026,007

UNITED STATES PATENT OFFICE 2,026,007

COIL SPRING

Herbert E. White, Lakewood, Ohio, assignor to Eaton Manufacturing Company, Cleveland, Ohio, a corporation of Ohio Application January 4, 1934, Serial No. 705,248

4 Claims. (Cl. 267—61)

This invention relates to coil springs and more particularly to helical compression springs for use in motor vehicles and for other purposes in which the springs support comparatively heavy loads and are subject to considerable action.

It is one of the objects of the invention to provide an improved end construction for springs made from round stock so as to utilize a greater portion of the length of the spring as the active flexing part thereof than has been possible with the end constructions that have heretofore been used.

A further object of the invention is to provide an end construction for coil springs that will be perfectly flat without the necessity for accurately grinding or otherwise machining the ends.

A further object of the invention is to provide an improvement in the end convolutions that will enable these convolutions to better support the adjoining convolutions and to avoid concentration of excessive stresses at any particular points in the spring.

A further object of the invention is to provide a coil spring with an improved type of construction for the end convolutions that will permit these convolutions to be more easily and accurately formed than has been the case with spring constructions heretofore used.

Other objects of the invention and the features of novelty will be apparent from the following description taken in conjunction with the accompanying sheet of drawing, of which Figure 1 is a side elevation of a coil spring embodying my invention;

Fig. 2 is a longitudinal section thereof on the line 2—2 of Fig. 1;

Fig. 3 is a plan view of the end portion of a straight rod such as is used in forming the spring shown in Fig. 1; and Fig. 4 is a section on the line 3—3 of Fig. 3.

Referring to the drawing, the spring illustrated in Fig. 1 is of helical form and comprises any suitable number of convolutions 10. The ends of the spring are flat, as indicated at 11, and the end convolutions 12 embody the novel features of my invention. The spring is made from round stock and about 270° of each of the end convolutions is provided with a groove, which faces the adjoining convolution, and gradually deepens to the free end of the convolutions so that the cross-section gradually changes from the round to a comparatively thin crescent shape at the free end, this crescent shape being indicated at 13.

In making the spring, the required length of rod is first subjected to an operation in which the ends are grooved, as indicated at 14 in Fig. 3. This grooving operation may be performed by rolling or otherwise, while the stock is hot, and it will be noted that the groove varies in depth from zero at the point 15 to a maximum at the end 16 of the rod. The radius of curvature of the groove is slightly greater than one-half of the diameter of the rod so that, when the spring is compressed, the adjoining convolution may become seated in the groove, without any tendency for rubbing action between the contacting surfaces which would tend to cause wear and thus weaken the spring.

After the rod has had its ends grooved as shown in Figs. 3 and 4, it is run through a coiling machine, such as is commonly used for making coil springs, and thus completed as shown in Fig. 1.

From Figs. 3 and 4 it will be evident that the depth of the metal at the mid-plane of the crescent-shaped cross-section will be a minimum at the end 16. The provision of the crescent-shaped cross-section gives to the end convolutions much greater strength and load-carrying capacity than would be the case if the end convolutions were simply ground or machined off to provide a flat end on the spring, as has been the practice heretofore. Because of the grooving of the end convolution it is possible to have the adjoining convolution in nesting relation therewith and thus permit the end of the spring to be formed flat without a grinding or machining operation.

While I have illustrated and described what I now consider to be the preferred embodiment of my invention, it will be evident to those skilled in the art that changes may be made in the details of construction which I have illustrated and described, without departing from the spirit of the invention as it is defined in the appended claims.

Having thus described my invention, I claim:

1. A coil spring made from round stock and having an end convolution provided with a portion which is of crescent-shaped cross-section, the radius of curvature of the concave side of said cross-section being greater than one-half the diameter of said round stock.

2. A coil spring made from round stock and having an end convolution the cross-section of which gradually changes from the round to crescent shape at the free end of the convolution.

3. A coil spring made from round stock and having end convolutions the cross-section of which gradually changes from the round to a reatively thin crescent shape at the free ends of the convolutions, and said end convolutions being so arranged that the adjoining convolutions will be supported in the concave portions of said end convolutions when the spring is compressed.

4. A coil spring made from round stock and having end convolutions the cross-section of which gradually changes from the round to a relatively thin crescent shape at the free ends of the convolutions, the radius of curvature of the concave surfaces of the end convolutions being greater than one-half the diameter of said round stock, and said end convolutions being so arranged that the adjoining convolutions will be supported in the concave portions of said end convolutions when the spring is compressed.

HERBERT E. WHITE.